(No Model.)
G. A. RIES.
COCK FOR GAS BURNERS.
No. 518,536. Patented Apr. 17, 1894.
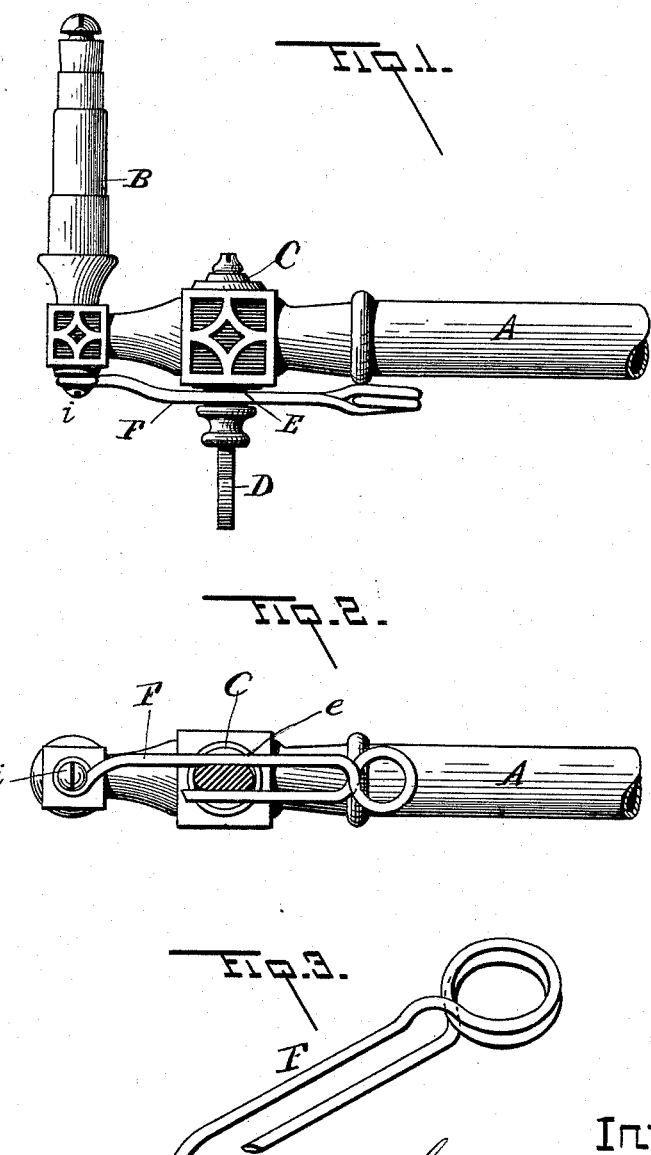

UNITED STATES PATENT OFFICE.

GEORGE A. RIES, OF SAN FRANCISCO, CALIFORNIA.

COCK FOR GAS-BURNERS.

SPECIFICATION forming part of Letters Patent No. 518,536, dated April 17, 1894.

Application filed August 8, 1893. Serial No. 482,693. (No model.)

*To all whom it may concern:*

Be it known that I, GEORGE A. RIES, a citizen of the United States, residing in the city and county of San Francisco and State of California, have invented certain new and useful Improvements in Cocks for Gas-Burners; and I do hereby declare the following to be a full, clear, and exact description of said invention, such as will enable others skilled in the art to which it most nearly appertains to make, use, and practice the same.

The object of my invention is to supplement the pin stop which is used for limiting the rotation of a gas cock when turning gas on or off from a burner, by connecting with it a simple safeguard and lock, which will insure the closing of the valve when the gas is turned off.

It consists in flattening the shank of the cock on two opposite sides between the key and valve, and applying a spring clamp to the shank, so that when the key is turned to open the gas passage the clamp is forced open by the increasing diameter of the shank, and when the key is turned to close the gas passage the clamps embrace the opposite flattened sides of the shank and hold the valve in its position.

Referring to the accompanying drawings, Figure 1 is a perspective view of a gas burner showing the spring clamp applied to the gas key. Fig. 2, is a plan view of the under side of the pipe showing the spring clamp applied to the key and Fig. 3 is a view of the spring clamp.

Let A represent the gas pipe of any gas fixture.

B is the burner, and C the valve that opens and closes the gas passage in order to admit the gas to or shut it off from the burner.

D is the key, by means of which the valve is turned.

In addition to using a pin and shoulder to limit the rotation of the valve, and indicate when the gas passage is closed, I flatten the two opposite sides of the shank $e$ between the valve and key, and apply a spring clamp F, so that it will pinch upon these two flattened sides when the passage is closed. The flattened sides are in line with the gas passage in the valve, so that when the valve is closed the flattened sides will be outward and parallel with the sides of the gas pipe A. The clamp which I use consists of a piece of spring, steel or wire bent into the horse shoe form, and having one arm or limb longer than the other. These arms straddle the shank of the key, and the end of the long arm is secured to the gas pipe by a screw $i$, leaving the other or short arm free. These spring arms clamp the flattened sides of the shank when the cock is closed, and hold the valve strongly in place. To open the cock the key is turned in the usual way in either direction, and as it is turned the increasing diameter of the shank forces the spring arms apart, and when the flattened parts of the shank are passed the arms will press against the rounded portion of the shank, and the valve can be left open to admit gas to the burner. The rounded faces of the shank are sufficient to give any required opening of the gas passage. When it is desired to shut off the gas, a slight turn of the key causes the clamp arms to pass the rounded parts of the shank, and the pressure of the arms will then snap the valve closed by the pressure of the clamp arms acting on the flattened part of the shank. I shall usually form the clamp arms with a spring coil at the bent end of the horse shoe as shown. By this arrangement it is impossible to leave the gas passage open when the light is extinguished, unless the light is blown out, because the clamp arms will close the valve and hold it closed when the gas is turned off sufficiently to extinguish the light.

This device is exceedingly simple, and can be easily applied to any gas burner.

Having thus described my invention, what I claim, and desire to secure by Letters Patent, is—

The combination, with a gas-cock, having its key-shank flattened on opposite sides, of a spring-clamp, having uneven-lengthed arms, the longer one adapted to be fixed to the burner, and the shorter one being free to flex or spring as the key is manipulated, and both arms resting flat against the flattened sides of said key-shank, substantially as set forth.

GEORGE A. RIES.

Witnesses:
HARRY C. A. GOTTUNG,
CHAS. J. ARMBRUSTER.